O. A. SMITH.
PROCESS OF TAPPING NUT BLANKS.
APPLICATION FILED DEC. 26, 1907.
900,042.
Patented Sept. 29, 1908.
2 SHEETS—SHEET 2.
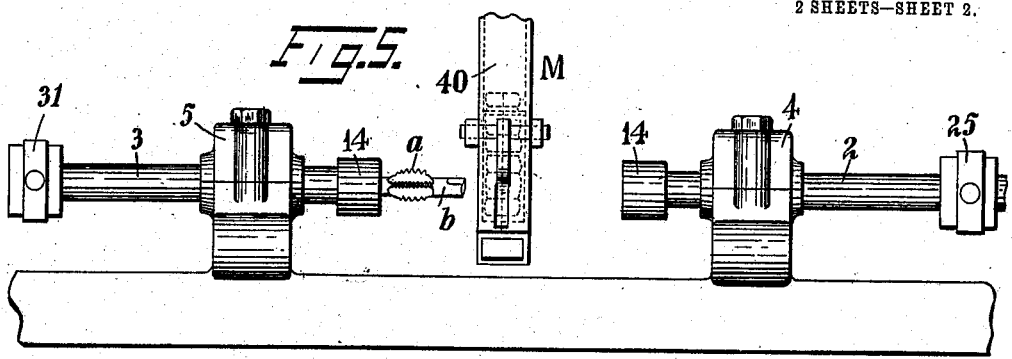
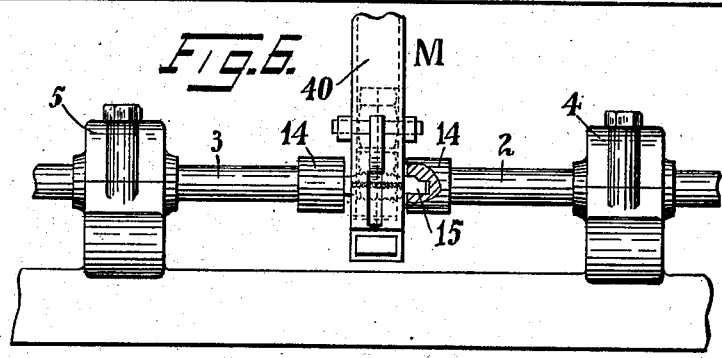
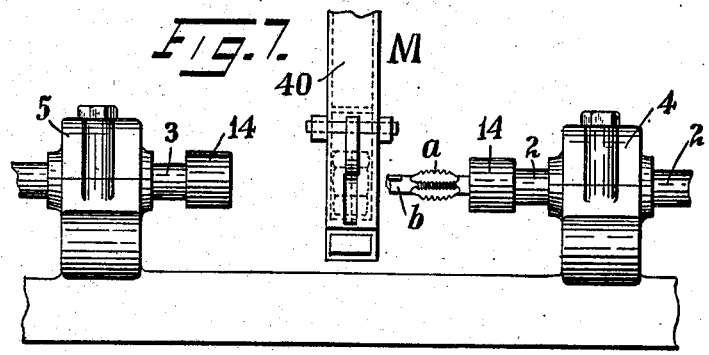
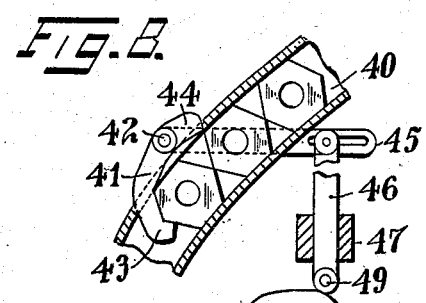
Witnesses:
S. Newman
H. D. Penney
Inventor:
Oscar A. Smith;
By his Attorney,
F. H. Richards

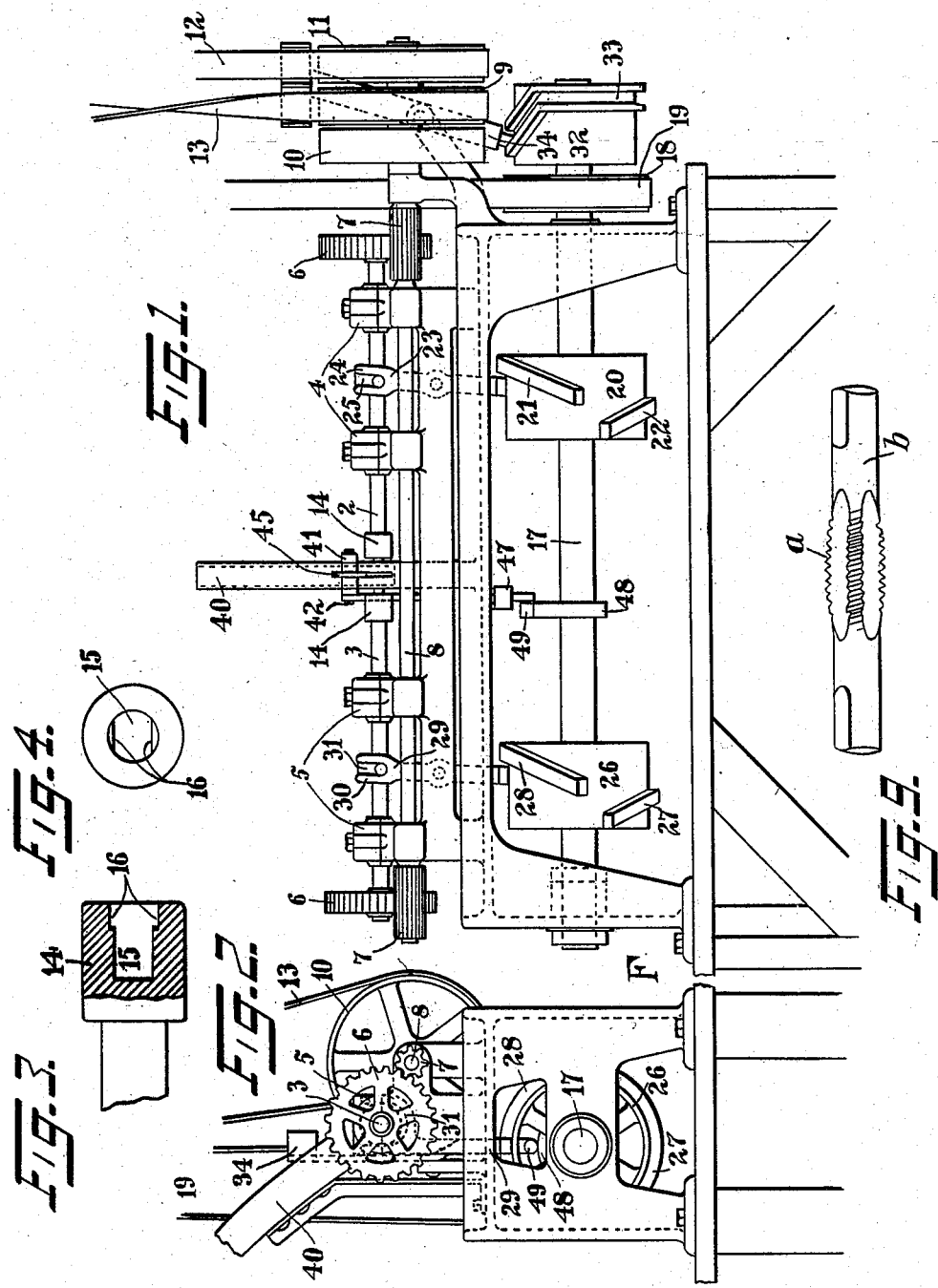

UNITED STATES PATENT OFFICE.

OSCAR A. SMITH, OF CLEVELAND, OHIO, ASSIGNOR TO EDWIN C. HENN, OF CLEVELAND, OHIO.

PROCESS OF TAPPING NUT-BLANKS.

No. 900,042.  Specification of Letters Patent.  Patented Sept. 29, 1908.

Original applications filed August 16, 1906, Serial No. 330,894, and August 24, 1906, Serial No. 331,825. Divided and this application filed December 26, 1907. Serial No. 408,164.

*To all whom it may concern:*

Be it known that I, OSCAR A. SMITH, a citizen of the United States, residing in Cleveland, in the county of Cuyahoga and State of Ohio, have invented certain new and useful Improvements in Processes of Tapping Nut-Blanks, of which the following is a specification.

This invention relates to the method of cutting threads in the bores of nut blanks and other members, the object of the invention being to provide an improved method whereby a series of nuts or nut blanks or other members are brought into position and while in such position the blanks are, by means of a single tool or cutter, automatically and successively cut or tapped from opposite sides, that is to say, one nut blank will be cut or tapped from one side, the tool passing therethrough, while a successive nut blank will be cut or tapped from the opposite side by the same tool passing backward therethrough.

The present application is a divisional application of that filed by me August 24, 1906, Serial No. 331,825, and of that filed by me on the 16th day of August, 1906, Serial No. 330,894.

In the present method the cutter or tap, which is in the form of a double ended, reversible tap, is passed entirely through the bore of the nut blank to cut a thread therein, and then returned through the bore of a successive blank to cut the same kind of a thread therein, the nut blanks being identical, so that by the present method successive nut blanks are cut from opposite sides with the same kind of thread and by the use of a single tool.

The present method consists in rotating and advancing a pair of opposed tool holding means alternately to engage by its opposite ends a double ended tool effective to cut from either end, thereby to pass it through blanks to cut the same kind of thread in such blanks first from one side and then from the other of successive blanks, said tool holding means being rotated together at the same speed during the cutting of one blank in one direction and during the cutting of a successive blank in the opposite direction.

One embodiment of a machine adapted for carrying out the present method is shown in the accompanying drawings, in which Figure 1 shows a front elevation; Fig. 2 is an end elevation; Fig. 3 is a detail view in elevation and section, showing one of the socket-spindles for operating the tap; Fig. 4 is an end view of the latter spindle; Figs. 5, 6 and 7 show the tap with its operating spindles and a magazine for the nut-blanks, the tap and spindles being in successive positions; Fig. 8 is a vertical section through the magazine, showing its mechanism for feeding the nut-blanks successively; and Fig. 9 is a view of the tap.

The special form of tap that the machine is designed to operate has the cutter portion $a$ located at the intermediate part of a shank $b$, the teeth being fully formed at the middle portion of the cutter, but reduced towards each end of the shank, instead of toward one end as in the usual construction. These teeth at one end are given the usual backward rake or inclination, but the rake at one end portion is in the opposite direction circumferentially from those at the other end. This is for the reason that when one end of the tap is inserted, the cutting teeth adjacent that end will have the usual backward rake to commence cutting the threads in the nut. The tap having passed entirely through the nut, is operated endwise in the opposite direction for the next blank. But, obviously, the tap must now be rotated in the opposite direction, since the thread cut will now be the same as in the previous blank. Therefore, the direction of rotation being reversed, the direction of the rake or inclination of the cutting teeth adjacent this end must be reversed.

The present machine, which is adapted for carrying out the process, comprises essentially two operating spindles that engage the opposite ends of the tap-shank respectively, and a magazine or holder, denoted generally by M, whereby the nut-blanks can be successively fed to a certain position, and rigidly held in such position while being engaged by the tap. The tap is engaged by one spindle and passed into the nut, by rotating the spindle and at the same time advancing it; in other words, giving it a spiral movement. Upon the tap passing partly through the nut-blank, as indicated in Fig. 6, its emerging end is engaged by the spindle member on the opposite side, which, obviously must rotate at the same speed. The threads partially cut in the nut-blank will of themselves advance the tap, moving it into the second spindle socket. Thereupon, the first spindle upon approaching the nut, will cease its advance, while the other spindle must retreat while rotating; that is, must move spirally away from the magazine. Upon the thread portion of the tap disengaging the nut, the second spindle will continue the advance of the tap, thereby causing it to travel entirely through the nut-blank. At this stage the tapped blank is ejected, and the succeeding blank fed to and locked in the same position. The second spindle now has its movement arrested and reversed to travel in the opposite rotative and advancing direction; that is, is moved in an opposite spiral direction. This will carry the end that has just moved out of the last blank, first into the next blank, and the opposite end of the cutter portion will first engage the nut-blank to start the thread in its bore. The continued rotating movement of the spindle, together with the advancing motion caused by the threads of the cutter and nut-blank, will carry the tap on through the second blank. Upon its entering end passing through the nut-blank it is engaged by the first spindle, that will now be given a spiral movement corresponding to that of the operating spindle. Upon the tap passing further through the blank, the second spindle will be arrested in its advancing movement, and the first spindle will retreat, carrying the tap entirely through the second blank and free thereof. Thereupon this nut-blank is ejected and the succeeding one placed in tapping position. The cycle of operations is now repeated as described, each succeeding nut-blank being tapped from opposite sides, but obviously the same identical thread is formed in each nut.

In the construction shown, on a suitable frame-work F are mounted spindles 2 and 3, one at each end of the machine, that are in alinement. These spindles are carried in one or more bearings 4 and 5 at each end, the spindles being endwise movable in the bearings as well as rotatable. Suitable means are provided whereby each spindle is rotated throughout its range of endwise movement. In the form shown, each spindle carries a gear 6 meshing with an elongated pinion 7, the gear 6 remaining in mesh therewith throughout its endwise movement. The two pinions 7 are fast on the shaft 8, extending from end to end of the machine, and driven by a pulley 9 fast thereon. Idle pulleys 10 and 11 are loose on the shaft on opposite sides of the pulley 9 to which reversing belts 12 and 13 are shifted, whereby the motion of the shaft 8 is reversed in the usual manner from two oppositely moving belts.

Each of the spindles is provided with means for engaging and disengaging the tap to rotate it and at the same time advance the tap. As shown, each spindle is provided with a socket member 14, shown separately in Figs. 3 and 4. This socket member is provided with a bore 15 fitting the shank of the tap, with reduced portions 16 on opposite sides of the socket, engaging flat portions on the tap-shank, to prevent rotation of the tap in the socket. By means of the main shaft 8 the two spindles will be simultaneously revolved and their motion reversed. The spiral motion of the spindles and sockets is, in the present construction, effected by means of cam straps. A shaft 17 is rotatable on the frame, preferably at its lower part, and driven by a pulley 18 fast thereon, from a belt 19, running on any suitable counter-shaft, not shown. On the shaft 17, near one end of the machine, is secured a drum 20, provided with cam-straps 21 and 22. A lever 23 is pivoted on the machine bed and has a forked end 24 engaging opposite sides of a disk 25 on the spindle 2. The lower end of the lever is engaged by the cam-straps 21 and 22. These straps are so designed and located on the drum that the spindle will first be advanced in one direction, then allowed to rotate in such position without advancing, and then moved back in its former position. Near the other end of the shaft 17 is a similar drum 26, provided with strap-cams 27 and 28 that alternately engage the lower end of a lever 29 pivoted on the machine bed. This lever has a forked end 30 engaging a disk 31 on the spindle 3. By this means the spindle 3 is alternately moved in opposite directions, similar to the operation of the spindle 2.

Means are provided whereby the revolution of the driving shaft 8, and hence that of the two spindles, is reversed at the proper time when the tap has passed entirely through one blank and another is presented for tapping. This means is preferably controlled by the shaft 17 and timed relative to the position of the cam-straps on the controlling drums. In the construction illustrated, a drum 32 is fast on one end of the shaft 17, near the nest of pulleys operating the shaft 8. The drum is provided with a cam groove 33 in its periphery, whose walls engage one end of a belt-shifter lever 34. By this means, when the cam-straps have shifted the spindles to one end, the belt-shifter is operated to shift the driving belt to the idle pulley and bring the other belt on to the driving pulley, thereby reversing the spindles.

The nut-blanks in the construction disclosed, are fed through a magazine or tube 40, whose bore is such that the nuts can slide down through the magazine, but are prevented from rotating therein or having any movement except to advance. The nuts are retained in operative position by means of a lever 41 pivoted at 42 on the magazine, and having a bent arm 43 arranged to engage the two lower sides of the nut-blank; thereby retaining the blank in position for threading. The other end 44 of the lever, upon being rocked to cause the end 43 to move out of the tube and free the nut, will engage the lower side of the succeeding nut and prevent its advancement until the first nut has been removed. Should this tapped nut not fall by gravity, the arm 44, in moving into position to engage the underside of a succeeding nut-blank, will strike the upper or rear side of the tapped or finished nut and start its downward movement. Upon the return movement of the lever, the arm 43 is in position to arrest the downward movement of the next nut-blank as soon as the arm 44 releases the blank, permitting it to advance. Suitable means are provided for rocking the arm 41. It is shown as having a slotted arm 45 that is engaged by a slide 46 movable in a block 47. The slide 46 is controlled by a cam 48 that is operated from any convenient part of the machine. The cam engages a roller 49 on the lower end of the slide.

In the operation of the machine the tap engaged by one of the spindles, as spindle 3, is moved to the right while rotating, to engage the positioned nut-blank. As the tap advances through the same, the second spindle 2 is moved in the opposite direction to receive the end of the tap as it passes through the blank. The spindles being constantly rotated in the same direction and at the same speed, they will have the tap-engaging portions always in the same relative position. The emerging end of the tap will therefore enter the socket of the second spindle and properly engage its flattened portions therein. At this period the advance of the first spindle will be arrested, while the second spindle will begin to retreat. The threads started in the nut-blank will have the effect of continuing the endwise movement of the tap and prevent the tap moving endwise in the second spindle socket. The retreat of the second spindle will continue and the tap will be passed entirely through the nut, as shown in Fig. 7. As soon as the tap is disengaged from the first spindle, this spindle is caused to retreat to its former position. The tapped blank is now ejected and a succeeding one locked in the same position. The straps on the operating drum now cause the second spindle to advance, and the end of the tap that just passed out of the last blank is moved into the now positioned blank. But the belt-shifter has operated to reverse the driving shaft 8, and hence the rotation of the spindles, and the tap now moves in the opposite direction into the nut-blank. At this stage the first spindle is again caused to approach the magazine, and as soon as the tap begins to pass through the bore of the nut-blank its end is engaged by the socket of the first spindle. The latter spindle now begins to retreat, and as soon as the second spindle reaches the magazine, its forward movement is arrested and the tap carried on entirely free of the nut and magazine, as indicated in Fig. 5. It is not necessary, so far as the tap is concerned, that the spindle on the opposite side from the tap be caused to retreat and then approach the magazine again, but this follows as a necessary consequence, as at each rotation of the operating shaft 17 the spindles must be given a complete reciprocation.

I claim as my invention:

1. The method of cutting blanks which consists in passing a double-ended tool so constructed as to cut, when moved endwise, in both directions, through a blank one end foremost, and then passing it in a reverse direction through a blank with its other end foremost.

2. The method of tapping nuts, which consists in holding a double ended tap by one end and screwing its other end foremost into a perforated nut blank, taking hold of the advancing end and screwing it entirely through the blank, releasing its opposite end, then reversing its rotation and screwing it back through another nut blank opposite end foremost.

OSCAR A. SMITH.

Witnesses:
J. H. DOHNER,
E. C. HENN.